Feb. 14, 1956  D. A. MILAN  2,734,583
SPRINKLING SYSTEM
Filed Aug. 7, 1953  2 Sheets-Sheet 1
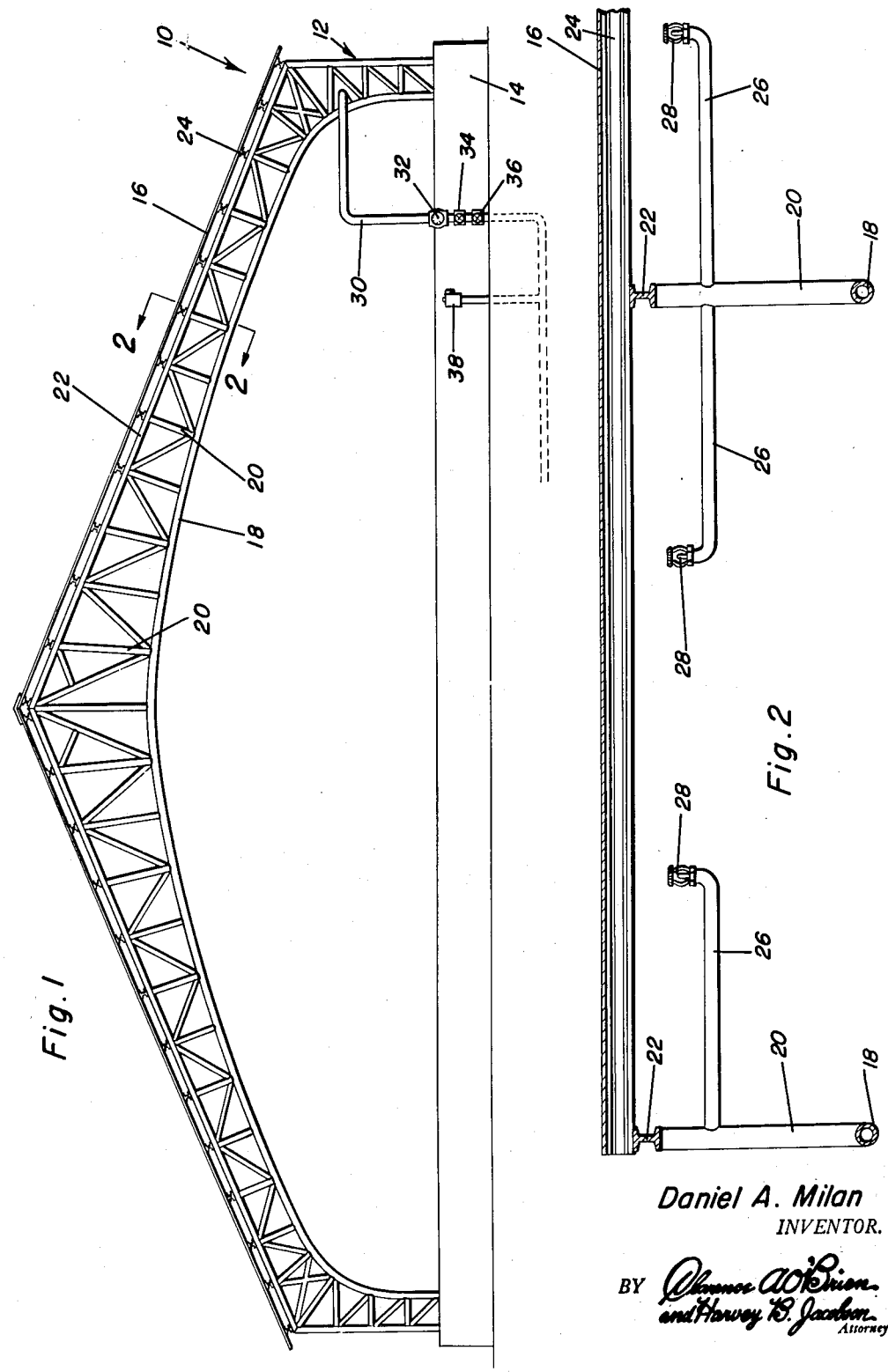
Daniel A. Milan
INVENTOR.

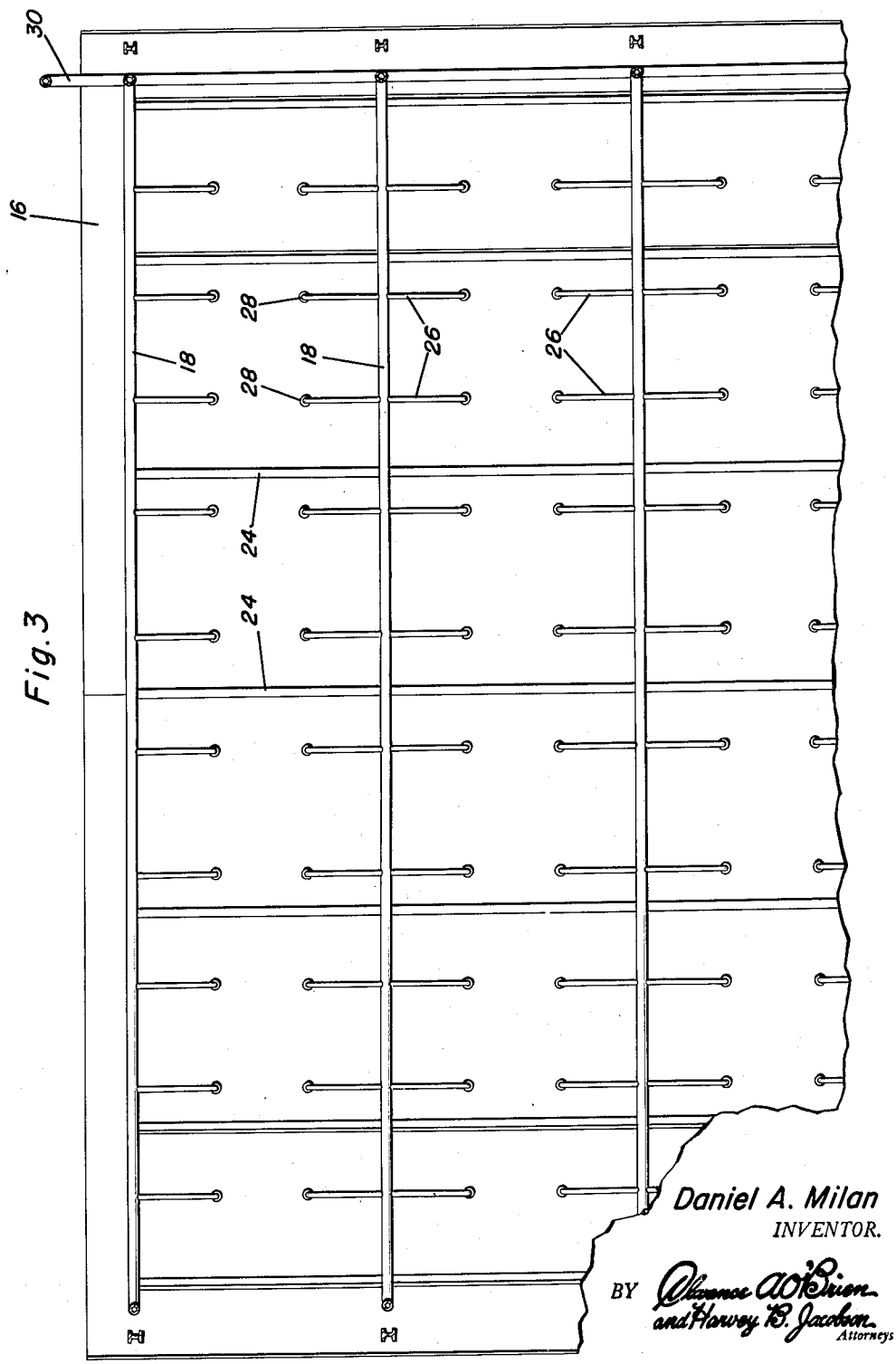

United States Patent Office 2,734,583
Patented Feb. 14, 1956

2,734,583
SPRINKLING SYSTEM

Daniel A. Milan, New Orleans, La.

Application August 7, 1953, Serial No. 372,832

4 Claims. (Cl. 169—5)

This invention relates to a sprinkler system and more specifically provides structural members used in a building which have passages therein for the flow of fire extinguishing fluid.

An object of this invention is to provide a sprinkler system for a building which has the piping system made into the structural members of the building thereby eliminating the installation of individual pipes for the sprinkler system.

A further object of this invention is to provide a sprinkler system which is installed as the structural members of the building are installed thereby eliminating the usual labor involved in installing the piping of a sprinkler system.

An important object of this invention is to provide a built-in sprinkler system which has passages made into the structural members and these passages may be used to circulate a cooling liquid or a heating liquid as well as a fire extinguishing liquid.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is an elevational view showing the sprinkling system of this invention used in an arch-type truss;

Figure 2 is a fragmental, vertical section of the structure of Figure 1 taken substantially along section line 2—2 in Figure 1 showing details of the roof supporting structure, truss struts, and the individual sprinklers; and Figure 3 is a bottom view looking up from the bottom of Figure 1 showing the arrangement of the individual sprinklers.

Referring now more specifically to Figures 1–3 of the drawings, it will be seen that the numeral 10 generally designates a building structure having an arch truss member 12, a base 14, and a roof 16.

Now looking more specifically to Figures 1 and 2, it will be seen that each arch truss member 12 is composed of an inner tubular member 18 which acts as the inner chord of the truss 12 and extending at substantially right angles along the upper surface of the member 18 are a plurality of tubular struts 20 in communication with the tubular chord 18. The tubular struts 20 are secured to the outer chord 22 of the truss 12. As best seen in Figure 2, the outer chord 22 forms a closure for the tubular struts 20 and the chords 22 also support the roofing stringers 24 and the roof 16. On each tubular strip 29 adjacent its upper end or outer end where it attaches to the outer chord 22 is a tubular pipe 26 in communication with the strut 20 and extending at right angles thereform and having a springler 28 at the outer end. As best seen in the left-hand portion of Figure 2, and the upper portion of Figure 3, the end truss members have only a sprinkler extending to one side which is the inside of the building 10 and the other truss members have the sprinklers 28 on each side of the tubular member 20 as best shown in the right-hand section of Figure 2. Now looking at Figure 1 the tubular inner chord 18 is in communication with a supply pipe 30 which is provided with a pipe valve 32, a gate valve 34, and a check valve 36, as well as an indicator valve 38.

The operation of the device will be readily understood. The truss members 12 are made up with the tubular inner chord 18 and the tubular strut members 20 as part of the arch truss and the sprinklers 28 with their passages 26 are all welded together in a suitable manner. The supply pipe 30 is attached to a source of water such as a city water main or to a supply of other fire extinguishing fluid and the valve mechanism functions to control the flow of the liquid in the tubular passages. The system can be used either as a dry pipe or wet system. Obviously, a cooling fluid or a heating fluid may be circulated through the tubular member 18 by providing a suitable return line for the system and this may be employed to heat or cool the building as desired. The particular shape of the structural member may be changed in view of the various types of building structures as desired. The particular shape of the structural member may be changed in view of the various types of buildings structures at desired by the builder.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. In a fire extinguishing sprinkler system for a building, a structural member having a tubular passage therein, means to supply fire extinguishing fluid to said passage, and means attached to said structural member in communication with said passage to discharge the fire extinguishing fluid into a building wherein said structural member is an arch truss with one chord of said truss being a tubular pipe and the struts of said truss being a tubular pipe in communication with said first pipe and supporting the other chord and a sprinkler in communication with each of said struts to discharge fire extinguishing fluid into a building.

2. The sprinkler system as defined in claim 1 wherein said sprinklers are spaced laterally from said tubular members.

3. In a sprinkling system for a building, a structural member having upper and lower chords, interconnecting struts positioned between said chords, said struts and one of said chords being constructed of tubular pipe, and a laterally extending tubular member secured to and in communication with each of said tubular struts, said struts communicating with said tubular chord, a discharge sprinkler positioned on the outer end of each of the lateral members, and means for connecting the tubular chord to a fluid supply.

4. The structure as defined in claim 3 wherein said structural member is in the form of an arch truss with the tubular chord being the tension lower chord member, and the struts being positioned substantially in perpendicular relation thereto.

References Cited in the file of this patent

UNITED STATES PATENTS

| | | |
|---|---|---|
| 431,203 | Dithridge | July 1, 1890 |
| 435,156 | Schmemann | Aug. 26, 1890 |
| 780,073 | Teal | Jan. 17, 1905 |
| 1,058,968 | Hammond | Apr. 15, 1913 |
| 1,190,824 | Vebelunas | July 11, 1916 |
| 2,477,394 | Spiker | July 26, 1949 |